(12) United States Patent
Huang et al.

(10) Patent No.: US 9,827,717 B2
(45) Date of Patent: Nov. 28, 2017

(54) STATISTICAL PREDICTIVE MODELING AND COMPENSATION OF GEOMETRIC DEVIATIONS OF 3D PRINTED PRODUCTS

(71) Applicants: Qiang Huang, Rancho Palos Verdes, CA (US); Tirthankar Dasgupta, Cambridge, MA (US); Sobambo Sosina, Somerville, MA (US)

(72) Inventors: Qiang Huang, Rancho Palos Verdes, CA (US); Tirthankar Dasgupta, Cambridge, MA (US); Sobambo Sosina, Somerville, MA (US)

(73) Assignees: University of Southern California, Los Angeles, CA (US); President and Fellows of Harvard College, Cambridge, MA (US)

( * ) Notice: Subject to any disclaimer, the term of this patent is extended or adjusted under 35 U.S.C. 154(b) by 269 days.

(21) Appl. No.: 14/827,956

(22) Filed: Aug. 17, 2015

(65) Prior Publication Data

US 2016/0046076 A1    Feb. 18, 2016

Related U.S. Application Data

(60) Provisional application No. 62/037,937, filed on Aug. 15, 2014.

(51) Int. Cl.
*B29C 67/00* (2017.01)
(52) U.S. Cl.
CPC ........ *B29C 67/0088* (2013.01); *B29C 67/007* (2013.01)
(58) Field of Classification Search
USPC ................................................ 700/118–119
See application file for complete search history.

(56) References Cited

U.S. PATENT DOCUMENTS

| 8,423,167 B2 * | 4/2013 | Sanders ................ A61F 2/5046 623/901 |
| 2014/0107823 A1 | 4/2014 | Huang |
| 2015/0331402 A1 * | 11/2015 | Lin ........................ G05B 15/02 700/119 |

OTHER PUBLICATIONS

Hilton, P.D. et al., eds. 2000. Rapid Tooling: Technologies and Industrial Applications. New York: Marcel Dekker, Inc., 2000. 267 pages.

(Continued)

*Primary Examiner* — Robert Fennema
*Assistant Examiner* — Marzia T Monty
(74) *Attorney, Agent, or Firm* — McDermott Will & Emery LLP

(57) ABSTRACT

A non-transitory, tangible, computer-readable storage media may contain a program of instructions that causes a computer system having a processor running the program of instructions to: receive design information indicative of the design of a three-dimensional object to be printed by a three-dimensional printer; receive test product deformation information indicative of deformation in the profiles of no more than five, three-dimensional test products that have a circular or polygonal cross section that were made by the three-dimensional printer; generate polygon product deformation information indicative of a predicted deformation of a polygon shape that the three-dimensional printer will print and that has a number of sides and a number of sizes that are both different from each of the number of sides and number of sizes that the no more than five, three-dimensional test products have; and generate adjustment information indicative of an adjustment needed to print a desired profile of the polygon shape that the three-dimensional printer will print to make the printed shape accurate.

7 Claims, 11 Drawing Sheets

(56) References Cited

OTHER PUBLICATIONS

Bourell, D.L. et al., eds. 2009. Roadmap for additive manufacturing: Identifying the future of freeform processing. Technical report, sponsored by the National Science Foundation and the Office of Naval Research. Published by The University of Texas at Austin, Laboratory for Freeform Fabrication, Advanced Manufacturing Center, Austin, TX, 102 pages.

Jin, J. et al. 2001. Automatic feature extraction of waveform signals for in-process diagnostic performance improvement. Journal of Intelligent Manufacturing, vol. 12, No. 3, pp. 257-268.

Kang, L. et al. 2000. On-line Monitoring When the Process Yields a Linear Profile. Journal of Quality Technology, vol. 32, No. 4, pp. 418-426.

Mestek, O. et al. 1994. Multivariate control charts: Control charts for calibration curves. Fresenius' journal of analytical chemistry, vol. 350, No. 6, pp. 344-351.

Mori, K. et al. 1996. Simplified three-dimensional simulation of non-isothermal filling in metal injection moulding by the finite element method. Engineering Computations, vol. 13, No. 2, pp. 111-121.

Rosenblatt, J.R. et al. 1981. Discussion [of a Bayesian analysis of the linear calibration problem by W.G. Hunter and W.F. Lamboy]. Technometrics, vol. 23, pp. 329-333.

Secondi, J. 2002. Modelling powder compaction: From a pressure-density law to continuum mechanics. Powder Metallurgy, Sep. 2002, vol. 45, No. 3, pp. 213-217.

Storakers, B. et al. 1999. The viscoplastic compaction of composite powders. Journal of the Mechanics and Physics of Solids, vol. 47, pp. 785-815.

Wang, X. 1999. Calibration of shrinkage and beam offset in SLS process. Rapid Prototyping Journal, vol. 5, No. 3, pp. 129-133.

Williams, J. et al. 2003. Phase I Monitoring of Nonlinear Profiles. Presented May 22, 2003 at 2003 Quality & Productivity Research Conference, Yorktown Heights, NY, 32 pages.

Woodall, W.H. et al. 2004. Using Control Charts to Monitor Process and Product Quality Profiles. Journal of Quality Technology, Jul. 2004, vol. 36, No. 3, pp. 309-320.

Woodall, W. 2007. Current research on profile monitoring. Producao, Sep.-Dec. 2007, vol. 17, No. 3, pp. 420-425.

Campbell, T. et al. 2011. Could 3d printing change the world? Technologies, Potential, and Implications of Additive Manufacturing. Atlantic Council: Ideas, Influence, Impact. Oct. 2011, pp. 1-15.

Cohen, D.L. et al. 2010. Geometric feedback control of discrete-deposition SFF systems, Rapid Prototyping Journal, vol. 16, No. 5, pp. 377-393.

Heralic, A. et al. 2012. Height control of laser metal-wire deposition based on iterative learning control and 3d scanning. Optics and Lasers in Engineering, vol. 50, No. 9, pp. 1230-1241.

Hu, D. et al. 2002. Improving solid freeform fabrication by laser-based additive manufacturing. Proceedings of the Institution of Mechanical Engineers, Part B: Journal of Engineering Manufacture, vol. 216, No. 9, pp. 1253-1264.

Huang, Q. et al. 2014. Predictive modeling of geometric deviations of 3d printed products—a unified modeling approach for cylindrical and polygon shapes. volume Finalist of Best Application Paper, Taipei, Taiwan. the tenth IEEE International Conference on Automation Science and Engineering (Case 2014).

Melchels, F.P.W. et al. 2010. A review on stereolithography and its applications in biomedical engineering. Biomaterials, vol. 31, No. 24, pp. 6121-6130.

Song, L. et al. 2011. Feedback control of melt pool temperature during laser cladding process. IEEE Transactions on Control Systems Technology, vol. 19, No. 6, pp. 1349-1356.

Tong, K. et al. 2003. . Parametric error modeling and software error compensation for rapid prototyping. Rapid Prototyping Journal, vol. 9, No. 5, pp. 301-313.

Tong, K. et al. 2008. Error compensation for fused deposition modeling (FDM) machine by correcting slice files. Rapid Prototyping Journal, vol. 14, No. 1, pp. 4-14.

Xu, K. et al. 2012. Mask image planning for deformation control in projection-based stereolithography process. ASME Computers and Information in Engineering Conference, Chicago, IL, USA, Aug. 12-15, 2012, (DETC2012-71523).

Xu, L. et al. 2013. Shape deviation modeling for dimensional quality control in additive manufacturing. No. IMECE2013-66329, San Diego, USA. Proceedings of the ASME 2013 International Mechanical Engineering Congress & Exposition.

\* cited by examiner

# STATISTICAL PREDICTIVE MODELING AND COMPENSATION OF GEOMETRIC DEVIATIONS OF 3D PRINTED PRODUCTS

CROSS-REFERENCE TO RELATED APPLICATION

This application is based upon and claims priority to U.S. provisional patent application 62/037,937, entitled "Algorithm for Predicting Quality of 3D Printed Products: From Cylindrical Shapes to Polygons," filed Aug. 15, 2014.

This application is also related to U.S. patent application Ser. No. 14/052,418, entitled "3D Printing Shrinkage Compensation Using Radial and Angular Layer Perimeter Point Information," filed Oct. 11, 2013; which claims priority to and incorporates by reference U.S. provisional patent application 61/712,723, entitled "Algorithm of Compensating Shape Shrinkage for 3D Printing Processes," filed Oct. 11, 2012.

The entire content of each of these applications and patents is incorporated herein by reference.

STATEMENT REGARDING FEDERALLY SPONSORED RESEARCH

This invention was made with government support under Grant No. N000141110671 awarded by the Office of Naval Research. The government has certain rights in the invention.

BACKGROUND

Technical Field

This disclosure relates to 3D printing, including compensating for printing errors.

Description of Related Art

Geometric fidelity of 3D printed products can be critical for Additive Manufacturing (AM) to be a direct manufacturing technology. Shape deviations of AM built products can be attributed to multiple variation sources, such as substrate geometry defect, disturbance in process variables, and material phase change.

Three strategies have been reported to improve geometric quality in AM: (1) control process variables x based on the observed disturbance of process variables $\Delta x$, (2) control process variables x based on the observed product deviation $\Delta y$, and (3) control input product geometry y based on the observed product deviation $\Delta y$.

Introduction of 3D Printing

Additive manufacturing (AM) or 3D printing directly fabricates physical products from a 3D CAD model by layered manufacturing processes. Since AM adds material layer by layer to construct products, this technique theoretically enables the direct printing of products with extremely complex geometry. Geometric complexity does not affect building efficiency, and no extra effort is necessary for molding construction or fixture tooling design, making 3D printing one of the most promising manufacturing techniques [Campbell, T., Williams, C., Ivanova, O, and Garrett, B. (2011). Could 3d printing change the world? Technologies, Potential, and Implications of Additive Manufacturing; Gibson, I., Rosen, D., and Stucker, B. (2009). *Additive manufacturing technologies: rapid prototyping to direct digital manufacturing*. Springer Verlag; Hilton, P. and Jacobs, P. (2000). *Rapid tooling: technologies and industrial applications*. CRC; Melchels, F., Feijen, J., and Grijpma, D. (2010). A review on stereolithography and its applications in biomedical engineering. *Biomaterials*, Vol. 31, No. 24, pages 6121-6130].

Despite these promising features, dimensional accuracy control remains a major bottleneck for the application of 3D printing in direct manufacturing. Shape deviations of AM built products can be attributed to multiple variation sources. For instance, [Cohen, D. L. and Lipson, H. (2010). Geometric feedback control of discrete-deposition sff systems, *Rapid Prototyping Journal*, Vol. 16, No. 5, pages 377-393.] summarized three classes of process uncertainties that could diminish the geometric fidelity of fabricated parts: situational, environmental, and build-material uncertainties with examples of substrate geometry defect, disturbance in process variables, and material phase change in each class, respectively.

TABLE 1

Feedback Control Strategies in Additive Manufacturing

| Variables Observed | Variables Actuated | Sample Literature |
| --- | --- | --- |
| 1. Process variables x substrate or nozzle position envelope temperature deposition tool temperature laser power material feedrate, etc | Process variables x substrate or nozzle position envelope temperature deposition tool temperature laser power material feedrate, etc | Hu, D., Mei, H., and Kovacevic, R. (2002). Improving solid freeform fabrication by laser-based additive manufacturing. *Proceedings of the Institution of Mechanical Engineers, Part B: Journal of Engineering Manufacture*, Vol. 216, No. 9, pages 1253-1264; Song, L. and Mazumder, J. (2011). Feedback control of melt pool temperature during laser cladding process. *IEEE Transactions on Control Systems Technology*, Vol. 19, No. 6, pages 1349-1356. |
| 2. Product deviation $\Delta y$ | Process variables x | Heralic, A., Christiansson, A.-K., and Lennartson, B. (2012). Height control of laser metal-wire deposition based on iterative learning control and 3d scanning. *Optics and Lasers in Engineering*, Vol. 50, No. 9, pages 1230-1241; Cohen, D. L. and Lipson, H. (2010). Geometric feedback control of discrete-deposition sff systems, *Rapid Prototyping Journal*, Vol. 16, No. 5, pages 377-393. |

TABLE 1-continued

Feedback Control Strategies in Additive Manufacturing

| Variables Observed | Variables Actuated | Sample Literature |
|---|---|---|
| 3. Product deviation $\Delta y$ | Design input of product geometry y | Tong, K., Lehtihet, E., and Joshi, S. (2003). Parametric error modeling and software error compensation for rapid prototyping. *Rapid Prototyping Journal*, Vol. 9, No. 5, pages 301-313; Tong, K., Joshi, S., and Lehtihet, E. (2008). Error compensation for fused deposition modeling (fdm) machine by correcting slice files. *Rapid Prototyping Journal*, Vol. 14, No. 1, pages 4-14; Huang, Q., Zhang, J., Sabbaghi, A., and Dasgupta, T. (2014a). Optimal offline compensation of shape shrinkage for 3d printing processes. *IIE Transactions on Quality and Reliability*, in press; Huang, Q., H., N., Xu, K., Chen, Y., Sosina, S., and Dasgupta, T. (2014b). Predictive modeling of geometric deviations of 3d printed products - a unified modeling approach for cylindrical and polygon shapes. volume Finalist of Best Application Paper, Taipei, Taiwan, the tenth IEEE International Conference on Automation Science and Engineering (CASE 2014). |

Literature Review on Geometric Quality Control

As summarized in Table 1, three feedback control strategies have been reported to reduce process uncertainties and improve geometric quality in AM: (1) control process variables x based on the observed disturbance of process variables $\Delta x$, (2) control process variables x based on the observed product deviation $\Delta y$, and (3) control input product geometry y based on the observed product deviation $\Delta y$. For instance, in the first category Hu et al. [Hu, D., Mei, H., and Kovacevic, R. (2002). Improving solid freeform fabrication by laser-based additive manufacturing. *Proceedings of the Institution of Mechanical Engineers, Part B: Journal of Engineering Manufacture*, Vol. 216, No. 9, pages 1253-1264.] studied the real-time sensing and control of metal powder delivery in laser-based AM. To achieve a controllable powder delivery, a closed-loop control system based on infrared image sensing was built for control of the heat input and size of the molten pool. Song and Mazumder [Song, L. and Mazumder, J. (2011). Feedback control of melt pool temperature during laser cladding process. *IEEE Transactions on Control Systems Technology*, Vol. 19, No. 6, pages 1349-1356.] monitored the melt pool temperature of a laser cladding process with a dual-color pyrometer. A state-space dynamic model was establish to relate the laser power with the melt pool temperature. The closed-loop process tracked and stabilized the melt pool temperature to a reference temperature profile.

In the second category, Heralic et al. [Heralic, A., Christiansson, A.-K., and Lennartson, B. (2012). Height control of laser metal-wire deposition based on iterative learning control and 3d scanning. *Optics and Lasers in Engineering*, Vol. 50, No. 9, pages 1230-1241.], to obtain a flat deposition surface in a Laser Metal-wire Deposition process, controlled the offset of the robot in the vertical direction based on the 3D scanned data. The deviations in the layer height were compensated by controlling the wire feed rate on next deposition layer through iterative learning control. Cohen and Lipson [Cohen, D. L. and Lipson, H. (2010). Geometric feedback control of discrete-deposition sff systems, *Rapid Prototyping Journal*, Vol. 16, No. 5, pages 377-393.] argued that monitoring the process variables $\Delta x$ could be limited the extent to which process uncertainties can be detected and corrected. They developed geometric feedback control to directly manipulate the location of deposited matter to compensate for geometric inaccuracies based on the observed whole-part geometry.

In the third category Tong et al. [Tong, K., Lehtihet, E., and Joshi, S. (2003). Parametric error modeling and software error compensation for rapid prototyping. *Rapid Prototyping Journal*, Vol. 9, No. 5, pages 301-313; Tong, K., Joshi, S., and Lehtihet, E. (2008). Error compensation for fused deposition modeling (fdm) machine by correcting slice files. *Rapid Prototyping Journal*, Vol. 14, No. 1, pages 4-14.], to control detailed features along the boundary of the printed product, changed the CAD design to compensate for shrinkage, and used polynomial regression models to analyze the shrinkage in X, Y, and Z directions separately. However, prediction of deformation based on the shift of individual points is independent of the geometry of the product, which is not consistent with the physical manufacturing process.

For complete control of all local features around the perimeter of a AM built part, Huang et al. [Huang, Q., Zhang, J., Sabbaghi, A., and Dasgupta, T. (2014a). Optimal offline compensation of shape shrinkage for 3d printing processes. *IIE Transactions on Quality and Reliability*, in press.] established a generic approach to model and predict part deviations and subsequently derived an optimal compensation plan to achieve dimensional accuracy. The essence of this new modeling approach is to transform in-plane (x-y plane) geometric errors into a functional profile defined on the polar coordinate system. This representation decoupled the geometric shape complexity from the deviation modeling and a generic formulation of shape deviations can thus be achieved. The developed approach was demonstrated both analytically and experimentally in a stereolithography process. Experimental results demonstrate the ability of the proposed compensation approach to achieve an improvement of one order of magnitude in reduction of geometric errors for cylindrical products. However, this study did not demonstrate how the established method can be extended to non-cylindrical products.

Huang et al. [Huang, Q., H., N., Xu, K., Chen, Y., Sosina, S., and Dasgupta, T. (2014b). Predictive modeling of geometric deviations of 3d printed products—a unified modeling approach for cylindrical and polygon shapes. volume Finalist of Best Application Paper, Taipei, Taiwan. the tenth IEEE International Conference on Automation Science and Engineering (CASE 2014).] attempted to connect the model for cylindrical shape with the model for polygon shapes in a unified modeling framework. The proposed model contains a basis function for cylindrical shape and a cookie-cutter basis function to carve out the polygon shape from the cylindrical shape. Experimental and analytical studies of square, pentagon, and dodecagon shapes were conducted to verify the unified model. However, the model fitting results, though good for square and pentagon shapes, need improvement for polygons with large number of sizes. In addition, individual models were fitted for each shape in Huang et al. [Huang, Q., H., N., Xu, K., Chen, Y., Sosina, S., and Dasgupta, T. (2014b). Predictive modeling of geometric deviations of 3d printed products—a unified modeling approach for cylindrical and polygon shapes. volume Finalist of Best Application Paper, Taipei, Taiwan. the tenth IEEE International Conference on Automation Science and Engineering (CASE 2014).], as opposed to a single integrated model. No compensation studies were provided to validate the proposed models.

SUMMARY

A non-transitory, tangible, computer-readable storage media may contain a program of instructions that causes a computer system having a processor running the program of instructions to: receive design information indicative of the design of a three-dimensional object to be printed by a three-dimensional printer; receive test product deformation information indicative of deformation in the profiles of no more than five, three-dimensional test products that have a circular or polygonal cross section that were made by the three-dimensional printer; generate polygon product deformation information indicative of a predicted deformation of a polygon shape that the three-dimensional printer will print and that has a number of sides and a number of sizes that are both different from each of the number of sides and number of sizes that the no more than five, three-dimensional test products have; and generate adjustment information indicative of an adjustment needed to print a desired profile of the polygon shape that the three-dimensional printer will print to make the printed shape accurate.

The product deformation information may be predictive of the deformation in the profiles of the no more than five, three-dimensional test products and may not not measured.

The prediction about the product deformation may have an uncertainty and the program of instructions may cause the computer system to quantify that uncertainty from the test product deformation information.

The program of instructions may cause the computer system to generate the polygon product deformation information by utilizing a mathematical function that defines a relationship between a circle and a polygon.

The mathematical function may include a square wave or sawtooth functional term.

The mathematical function may be learned from the test product deformation information.

The program of instructions may cause the computer system to optimize the adjustment needed to print the desired profile of the polygon shape by minimizing the predicted deformation of the polygon shape.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 1A depicts a polar coordinate representation. FIG. 1B shows shrinkage under polar coordinates.

FIG. 2A depicts observed and posterior predictive distribution. FIG. 2B shows a validation result for a 2.5 inch cylinder.

FIG. 4A depicts a regular polygon with circumcircle radius r. FIG. 4B depicts an irregular polygon with circumcircle radius r.

FIG. 5A shows cylinders and square after repair; FIG. 5B illustrates square shapes before repair.

FIG. 6A shows two regular pentagon deviation profiles with circumcircle radii=1", 3" (shown in solid lines). FIG. 6B depicts a printed regular pentagon with circumcircle radius=3".

FIG. 7A shows a regular dodecagon deviation profile (solid line) with circumcircle radius=3". FIG. 7B depicts a printed dodecagon with circumcircle radius=3".

FIG. 10A shows polygon deviation profiles and model predictions. FIG. 10B depicts model validation by predicting dodecagon deviation profile.

FIG. 11A shows an optimal compensation $x^*(\theta)$. FIG. 11B shows dodecagon deviation profiles before and after compensation.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Discussed below is are approaches that improve accuracy in additive manufacturing (AM) by changing the CAD design to optimally compensate for anticipated product deviations. To accomplish this goal, a predictive model forecasts the quality of a wide class of product shapes, particularly considering the vast library of AM built products with complex geometry. The approach uses statistical predictive modeling and compensation to predict and improve the quality of both cylindrical and prismatic parts. Experimental investigation and validation of polyhegron indicates the ability to predicte and compensate a wide class of products built through 3D printing technology.

Deviation Modeling of Cylindrical Products—Previous Work

In a previous study to describe the deviation of a 3D printed product from its intended shape [Huang et al. 2014a, cited above.], the Polar Coordinate System (PCS) using $(r,\theta,z)$ was chosen over the Cartesian Coordinate System (CCS) using coordinates $(x,y,z)$. As shown in FIG. 1 [Huang et al. 2014a, cited above], the product is specified by the function $r(\theta,r_0(\theta,z),z)$ at the boundary, and the shape deviation is represented as:

$$\Delta r(\theta, r_0(\theta), z) = r(\theta, r_0(\theta, z), z) - r_0(\theta, z) \quad (1)$$

The Cartesian representation has been previously studied in the literature [Tong et al., 2003, 2008, cited above.]. It faces a practical issue of correctly identifying shape deviation. As shown in FIG. 1B, for a given nominal point A(x,y,z), its final position A' may be difficult to identify after shrinkage. A practical solution may be to fix the x or y coordinate and study the deviation of the other coordinate ($\Delta x$ or $\Delta y$ in FIG. 1B. Choice of either direction could lead to different shrinkage results. Another method is to study shrinkage along three directions separately [Tong et al., 2003, 2008, cited above]. But the apparent correlation of shrinkage among the three directions cannot be captured, potentially leading to prediction error.

Figure 1A:
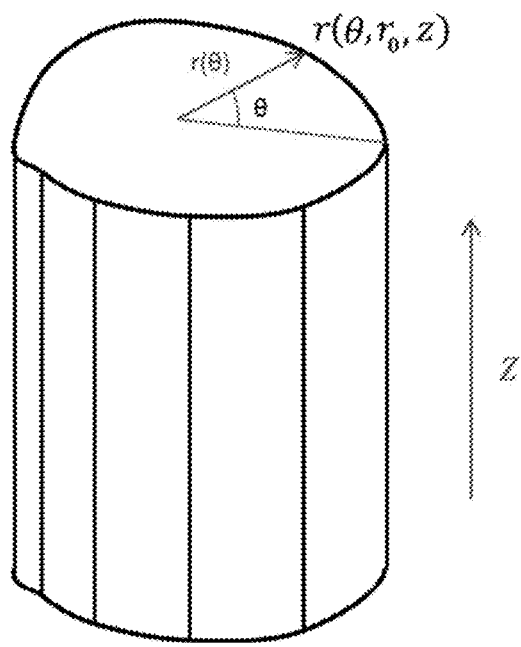
FIGS. 1A-1B illustrate shrinkage representation under a polar coordinate system.
Figure 1B:
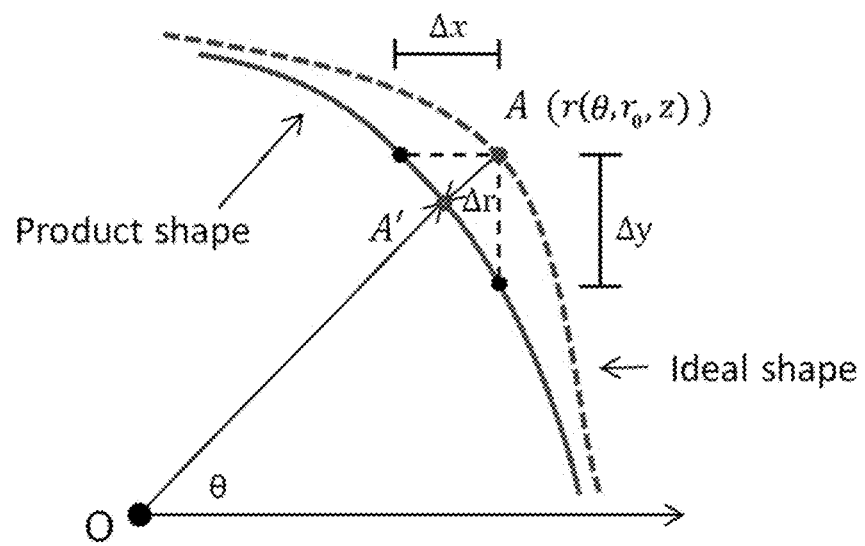

FIGS. 1A-1B illustrate shrinkage representation under a polar coordinate system. FIG. 1A depicts a polar coordinate representation. FIG. 1B shows shrinkage under polar coordinates.

Figure 2A:
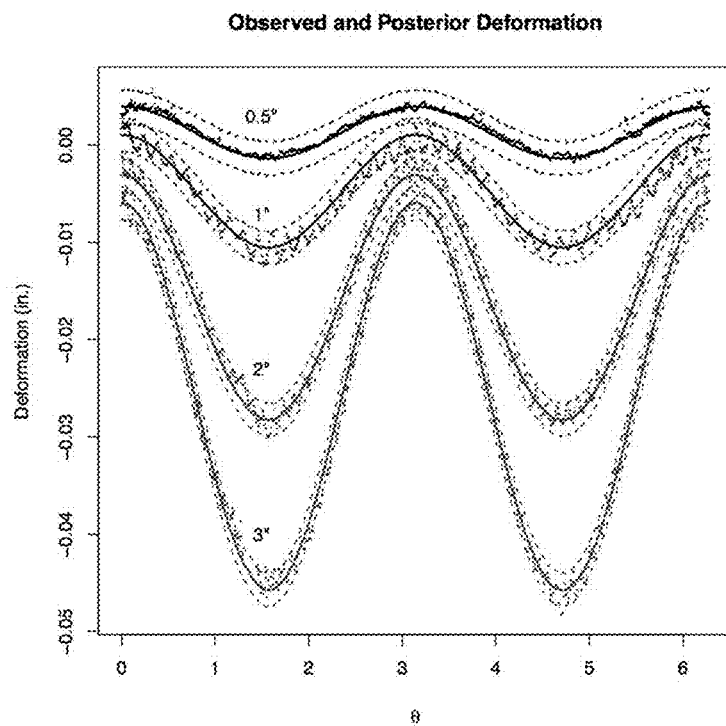
FIGS. 2A-2B illustrate in-plane error of cylindrical parts with $r_0=0.5"$, 1", 2", 3" and validation for a 2.5" cylinder.

In contrast, a definition described herein of radius deviation naturally captures geometric errors and is convenient for visualizing patterns, as shown in FIG. 2A, the in-plane geometric errors of cylindrical products built by the stereolithography (SLA) processes [Huang et al. 2014a, cited above].

Figure 2B:
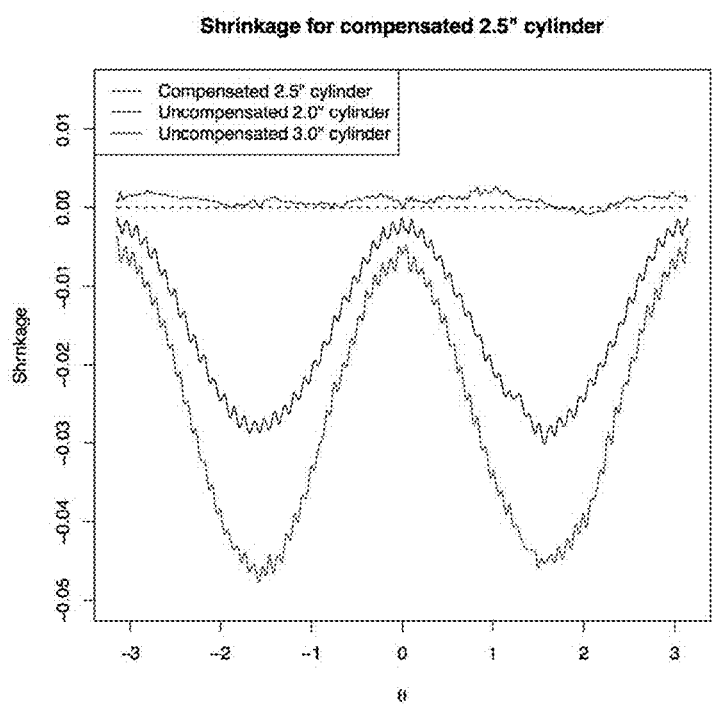

FIGS. 2A-2B illustrate in-plane error of cylindrical parts with $r_0$=0.5", 1", 2", 3" and validation for 2.5" cylinder [Huang et al. 2014a, cited above.] FIG. 1A depicts a polar coordinate representation. FIG. 1B shows shrinkage under polar coordinates.

This representation transforms in-plane (x-y plane) geometric errors into a functional profile defined on the interval [0,2π]. This representation decoupled the geometric shape complexity from the deviation modeling and a generic formulation of shape deviations can thus be achieved.

Since the ultimate goal of the third strategy of feedback control is to change the CAD input $r_0(\theta,z)$ to compensate for product deviations, the functional dependence of shrinkage $\Delta r(\theta,r_0(\theta,z),z)$ (denoted as $f(\theta,r_0(\theta,z),z)$ hereafter) on $\theta$, z may be modeled as $$f(\theta, r_0(\theta)) = f_1(\psi) + f_2(\theta, r_0(\theta)) + \epsilon_\theta. \quad (2)$$

where function $f_1(\psi)$ represents average deviation or trend independent of location variable $\theta$, which is often related to the volumetric change of the product. Function $f_2(\theta,r_0(\theta))$ is the location-dependent shrinkage in addition to the trend. Term $\epsilon_\theta$ represents high frequency components that add on to the main harmonic trend.

$f_1(\cdot)$ is interpreted as a lower order term and $f_2(\cdot,\cdot)$ as a higher order component of the deviation function. With the data shown in FIGS. 2A-2B, it is natural to conduct Fourier series expansion of $f_2(\cdot,\cdot)$:

$$f(\theta, r_0(\theta)) = c + \sum_k \{a_k \cos(k\theta) + b_k \sin(k\theta)\} + \varepsilon_\theta \quad (3)$$

and the deviation of cylinders with various sizes at location $\theta$ is given as $$E[f(\theta, r_0(\theta))|\theta] = x_0 + \beta_0(r_0+x_0)^a + \beta_1(r_0+x_0)^b \cos(2\theta) \quad (4)$$

where $x_0$ is a constant effect of over exposure for the process that was studied, which is equivalent to a default compensation $x_0$ applied to every angle in the original CAD model. Note that the in-plane (x-y) shrinkage error is of primary interest and the coordinate z is ignored.

Model (4) is fit to data for 0.5", 1", 2", and 3" radius cylinders, and a Bayesian approach was adopted with a weakly informative prior for $x_0$ of $\log(x_0):N(0,1)$ a priori. The posterior predictive distribution of the shrinkages generated by this model is presented in FIG. 2A (shown in dashed lines).

The optimal compensation $x^*(\theta)$ to reduce deviation around the perimeter of cylindrical products in SLA processes will be $$x^*(\theta) = -\frac{x_0 + \hat{\beta}_0(r_0+x_0)^{\hat{a}} + \hat{\beta}_1(r_0+x_0)^{\hat{b}} \cos(2\theta)}{1 + \hat{a}\hat{\beta}_0(r_0+x_0)^{\hat{a}-1} + \hat{b}\hat{\beta}_1(r_0+x_0)^{\hat{b}-1} \cos(2\theta)}. \quad (5)$$

This model is predictive and the validation experiment on the compensation strategy showed that the deviation of a cylinder with 2.5" radius can be dramatically reduced (FIG. 2B). Note that no experiment on the cylinder with 2.5" was done before compensation, which demonstrated the predictability of the developed model.

Experimental Study of Polygon Shape Deviations

Although model (2) is quite generic and model (3) seems easily extendable beyond cylinders, in this section, the deviations of AM built products with (in-plane) polygon shapes is first experimentally investigated. There are two reasons to choose polygon shapes: (1) Polygons have sharp corners causing more significant manufacturing challenge than cylinders; (2) When the number of polygon sides increase, the polygon model should approach to the cylinder model defined in Eq.(4); and (3) Combination of sections of cylindrical and polygon shapes will lead to a wider classes of products. Polygon experiments therefore provide an opportunity to test the generality and validity of the proposed approach.

AM Experiments—Stereolithography Process (SLA)

The AM process a variant of the SLA process, called Mask Image Projection SLA (MIP-SLA) [Zhou, C., Chen, Y., and Waltz, R. A. (2009). Optimized mask image projection for solid freeform fabrication. *ASME Journal of Manufacturing Science and Engineering*, Vol. 131, No. 6, page 061004.].

Figure 3:
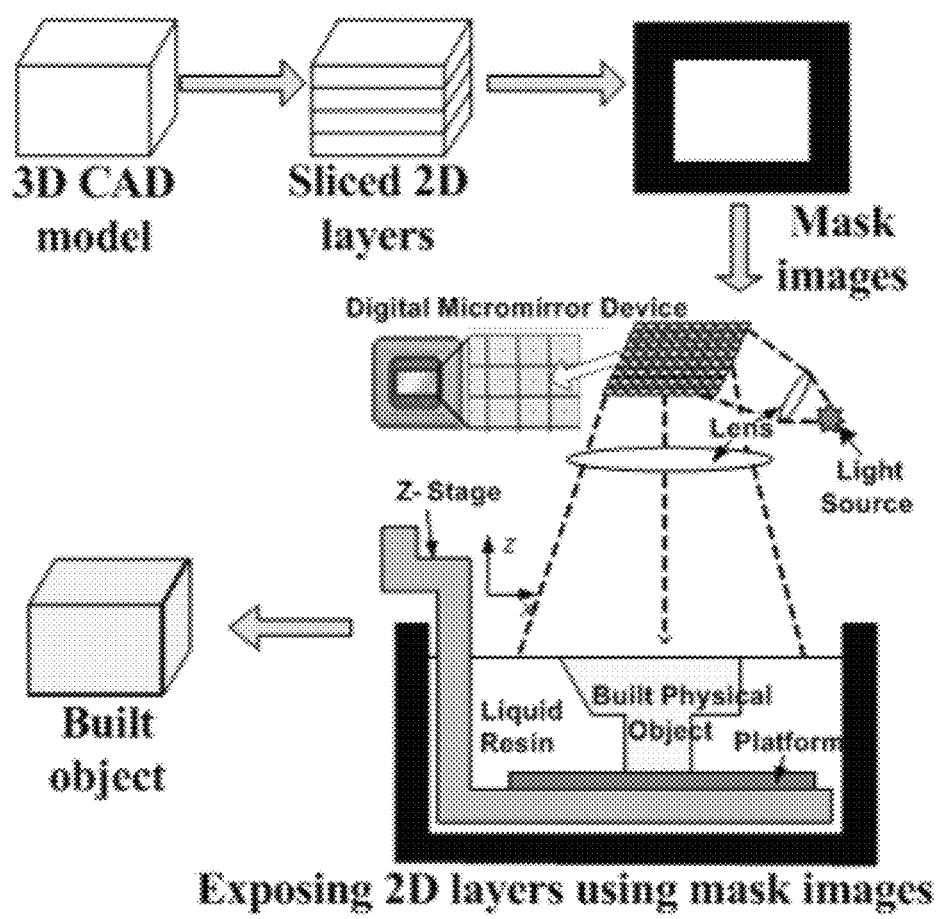
FIG. 3 illustrates an MIP-SLA process.

FIG. 3 illustrates an MIP-SLA process [Xu, K. and Chen, Y. (2012). Mask image planning for deformation control in projection-based stereolithography process. *ASME Computers and Information in Engineering Conference*, Chicago, Ill., USA, Aug. 12-15, 2012, (DETC2012-71523).] As can be seen in FIG. 3, the MIP-SLA machine 301 has liquid resin 303 stored in a tank 305 configured with a platform 307 that can move vertically with precision under automated control. During the printing process, the surface of the resin 309 is exposed to light, which triggers the resin solidification. Control of light exposure area and intensity is achieved through a digital micromirror device (DMD) 311 that receives commands from the sliced cross-section of STL files 313 for each layer. The platform 307 in the tank 305 automatically moves down with the predefined thickness for printing the next layer when the previous layer is solidified. This building process is repeated until the last layer is built. MIP-SLA is considered as an inexpensive fast additive manufacturing technique, since it is capable of building multiple objects simultaneously.

In this experiment, the shape deviation of polygons, parts with sharp corners was investigated. A commercial MIP-SLA platform and the ULTRA machine from EnvisionTec was used to conduct all experiments. The material used in this process was SI500 resin that shrinks approximately 2% in each phase transition. Specification of the manufacturing process is shown in Table 2.

TABLE 2

The specific parameters in MP-SLA process

| | |
|---|---|
| Height of the product | 0.25" |
| Thickness of each layer | 0.00197" |
| Resolution of the mask | 1920*1200 |
| Dimension of each pixel | 0.005" |
| Illuminating time of each layer | 7 s |
| Average waiting time between layers | 15 s |
| Type of the resin | SI500 |

Experimental Design and Observations

The experimental factors considered for polygon experiments include the number of sides and the size of a polygon. When the number of sides increases, the corner angles of a polygon vary. The polygon size is defined as the radius of its circumcircle (see examples in FIGS. 4A-4B). The purpose of using a circumcircle is to connect the polygon experiments with cylindrical experiments done before.

TABLE 3

Polygon experimental design

| Cross-section geometry | Circumcircle radius | Process condition |
|---|---|---|
| Square | r = 1"/√2; 2"/√2; 3"/√2 | before machine repair |
| Square | 2"/√2 | after machine repair |
| Regular Pentagon | r = 1"; 3" | after repair, settings changed |
| Regular Dodecagon | r = 3" | after repair, settings changed |
| Circle | r = 1"; 2" | after repair, settings changed |

Three polygon shapes were investigated: square, regular pentagon, and dodecagon. As shown in Table 3, four squares with side lengths of 1", 2" (before and after repair) and 3" (or circumcircle radii of 1"/√2, 2"/√2, and 3"/√2), two regular pentagons with circumcircle radii 1" and 3" and one regular dodecagon (polygon with 12 sides) with circumcircle radius of 3" were designed and fabricated in a MIP-SLA machine. The purpose of fabricating a dodecagon was to check how well a model can be generalized to different polygons and how well a polygon model can be approximated by a cylindrical shape when the number of polygon sides is large. Since it was discovered in Huang et al. [Huang et al. 2014b, cited above] that the MIP-SLA machine settings were changed after repair, new experiments on cylindrical parts were also included for experimentation in this study with r=1" and 2".

Figure 4A:
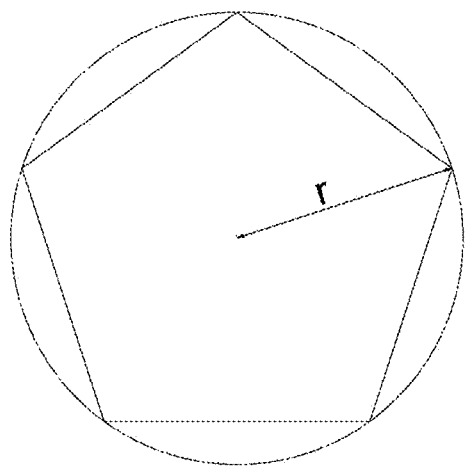
FIGS. 4A-4B illustrate a polygon experimental design.
Figure 4B:
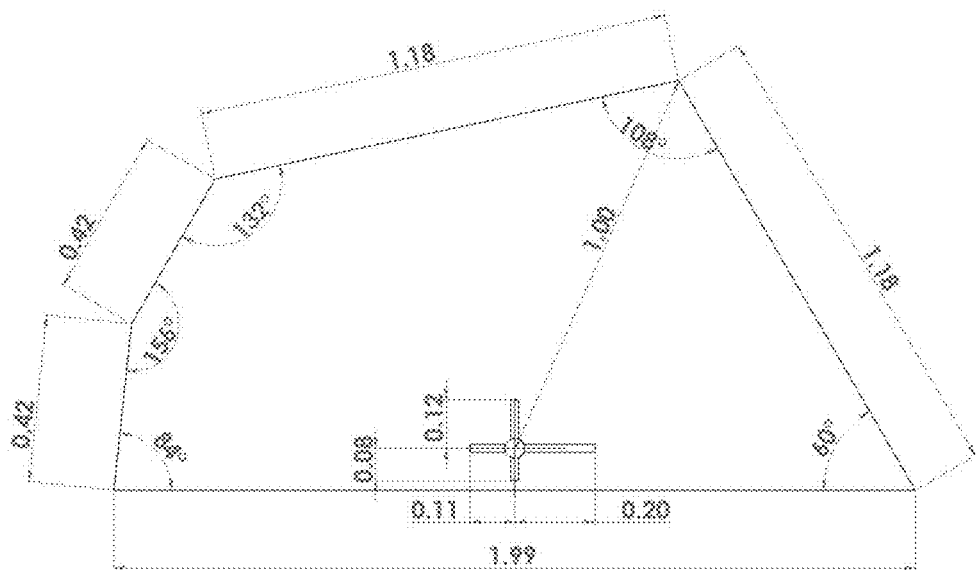

FIGS. 4A-4B illustrate a polygon experimental design. FIG. 4A depicts a regular polygon with circumcircle radius r. FIG. 4B depicts an irregular polygon with circumcircle radius r.

To facilitate the identification of the orientation of test parts during or after the building process, a non-symmetric cross with line thickness of 0.02" was added on the top of them (see FIG. 4B). All test parts had height of 0.25" The 3D CAD models were exported to STL format file, which were then sent to the SLA machine.

Figure 5A:
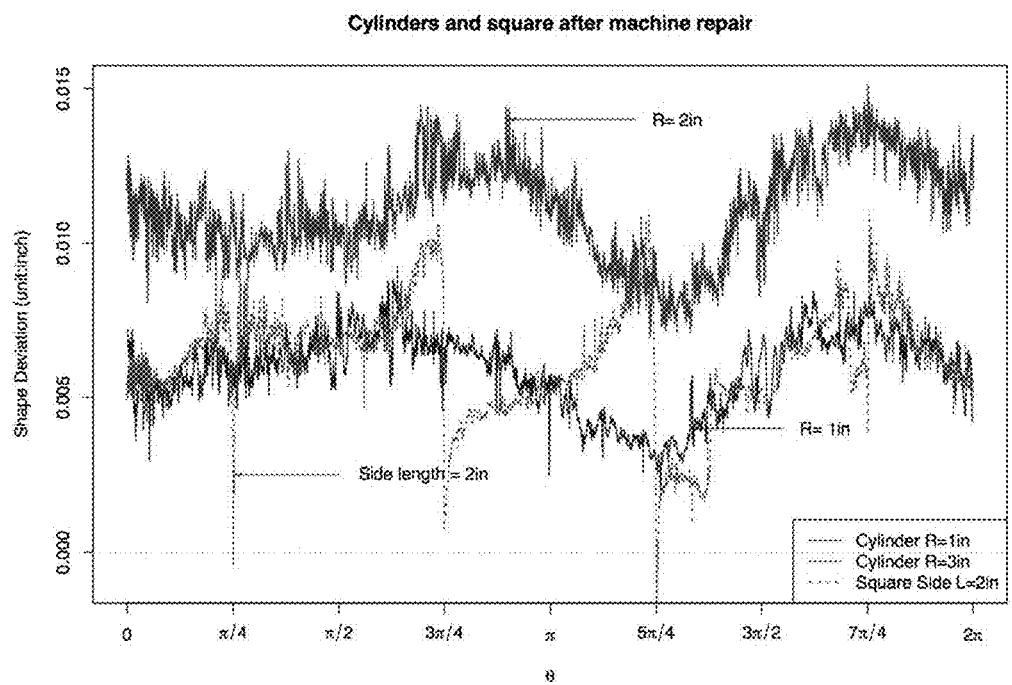
FIGS. 5A-5B illustrate deviation profiles (solid lines) of cylinders with $r_0=1"$, 2" and square shapes with side length=1", 2", 3".
Figure 5B:
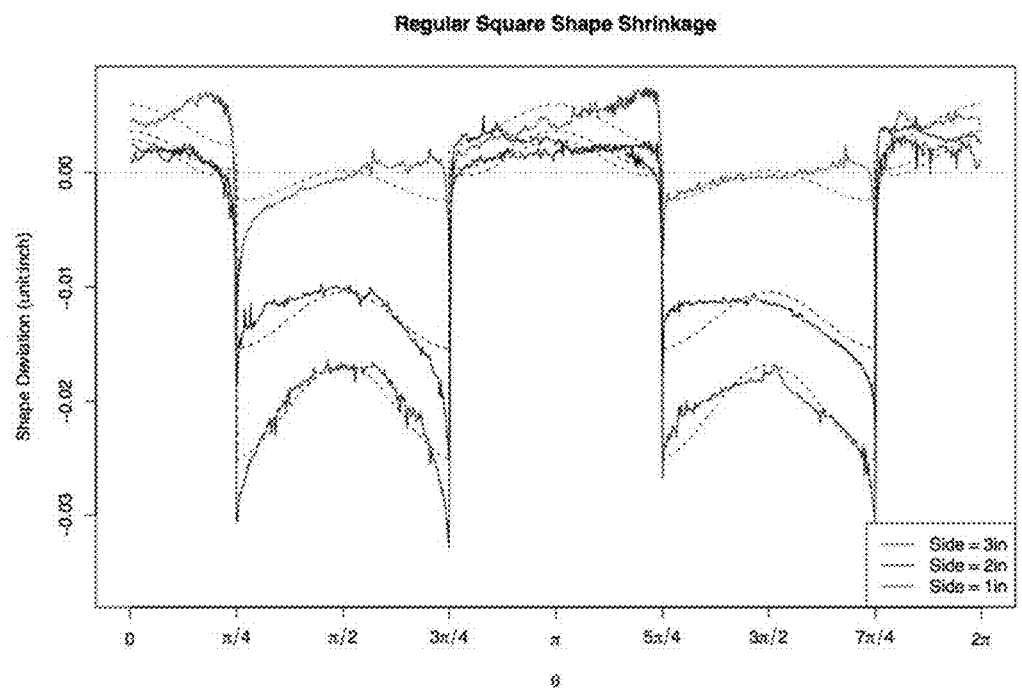

FIGS. 5A-5B illustrate deviation profiles (solid lines) of cylinders with $r_0$=1", 2" and square shapes with side length=1", 2", 3". FIG. 5A shows cylinders and square after repair; FIG. 5B illustrates square shapes before repair.

After the building process, all test parts were measured using a Micro-Vu precision machine. In order to reduce human errors, the same measuring procedure was followed for each test part. For simplicity of measurement, the center of the cross was chosen to be the origin of the measurement coordinate system in the Micro-Vu machine. The boundary profile was fitted using the splines in the metrology software associated with the Micro-Vu machine. The obtained measurement data were then converted to polar coordinates for deviation modeling and analysis. The part orientation was kept the same during the building and measurement processes. FIGS. 5A-5B, 6A-6B, and 7A-7B show the measured deviation profiles (solid lines) for three kinds of polygons and cylinders presented in the PCS.

Figure 6A:
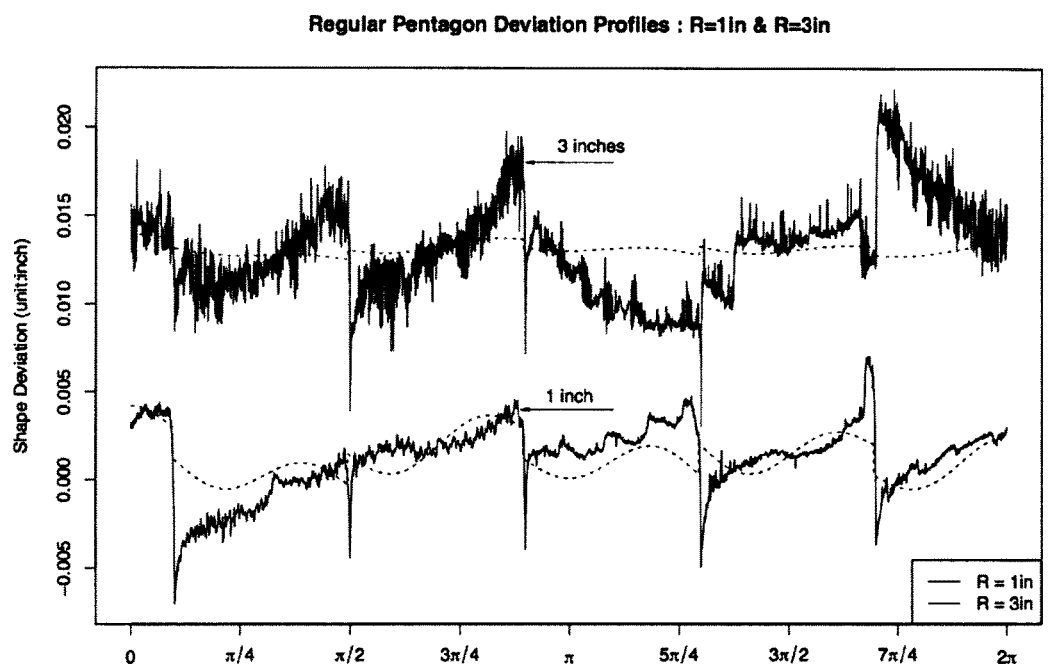
FIGS. 6A-6B illustrate observed deviation profiles for pentagons.
Figure 6B:
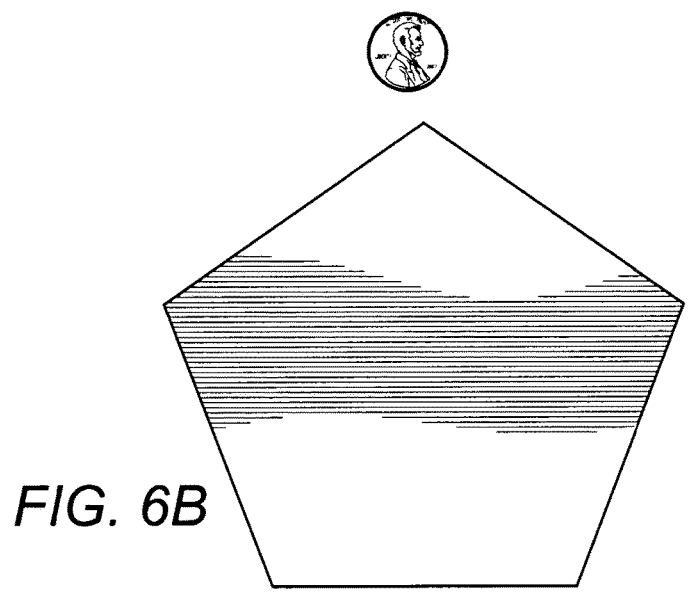

FIGS. 6A-6B illustrate observed deviation profiles for pentagons. FIG. 6A shows two regular pentagon deviation profiles with circumcircle radii=1", 3" (shown in solid lines). FIG. 6B illustrates a printed regular pentagon with circumcircle radius=3".

By comparing the deviation profiles of cylindrical and square shape before and after the machine repair (FIG. 2 vs. FIG. 5), it is clear that (1) the repaired the MIP-SLA machine tends to over-compensate the product shrinkage and lead to positive shape deviation; and (2) The systematic deviation patterns in square shape clearly differ before and after the machine repair. Therefore, the following section identifies basic deviation patterns consistent across different shapes and provides an integrated model for prediction and compensation.

Figure 7A:
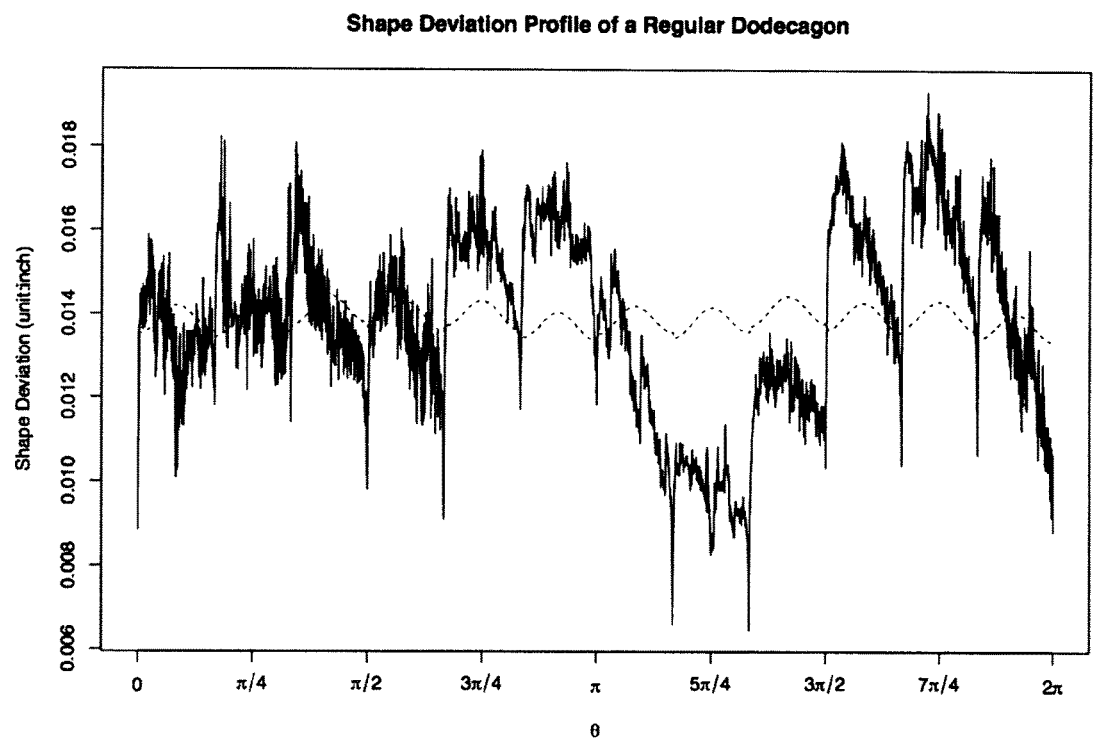
FIGS. 7A-7B illustrate an observed deviation profile for a dodecagon.
Figure 7B:
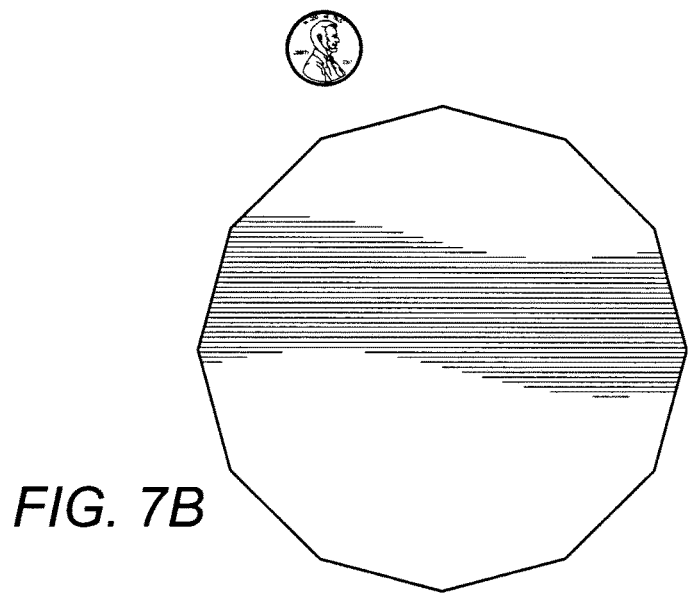

FIGS. 7A-7B illustrate an observed deviation profile for a dodecagon. FIG. 7A shows a regular dodecagon deviation profile (solid line) with circumcircle radius=3". FIG. 7B depicts a rinted dodecagon with circumcircle radius=3".

Statistical Modeling Strategy

Following the same notation in model (2), $f(\theta, r_0(\theta))$ was denoted as the in-plane shape deviation of 3D printed product presented in the polar coordinate system. The Fourier expansion of $f(\theta, r_0(\theta))$, though works well for the cylindrical shape, clearly encounters the difficulty of model fitting for polygon shapes, i.e., too many high-order Fourier basis terms have to be included in order to capture the sharp transition at the polygon vertices. There are two disadvantages: (1) model over-fitting which causes poor predictability; and (2) lack of physical insights gained from the model.

Xu et al. [Xu, L., Huang, Q., Sabbaghi, A., and Dasgupta, T. (2013). Shape deviation modeling for dimensional quality control in additive manufacturing. Number IMECE2013-66329, San Diego, USA. Proceedings of the ASME 2013 International Mechanical Engineering Congress & Exposition.] studied the experimental data of FIGS. 2A-2B and 5A-5B and proposed the hypothesis of shape deviation due to different shrinkage factors along different directions. Xu et al. [Xu et al. 2013, cited above] explained the mechanism considering (i) over or under exposure, (ii) light blurring and (iii) phase change induced shrinkage or expansion. A shape deviation model based on shrinkage factors was established to quantify the effects of three sources for both cylindrical and square shapes with various sizes. The attempt assists to understand the physical insights of the AM processes. Since the objective is to control input product geometry y based on the observed product deviation $\Delta y$, the statistical patterns in the deviation profiles are identified, rather than the specific physical mechanisms contributing to the deviation profiles.

The main strategy of connecting the cylindrical shape model to polygon models is to treat a polygon as being cut from its circumcircle as shown in FIGS. 4A-4B. This modeling strategy implies that a generic deviation profile model for cylinders or polygons contains at least two major basis functions: (1) basis model $g_1$ for cylindrical shape deviation profile, and (ii) basis model $g_2$ for a cookie-cutter function. This concept extend the previous model in Eq. 2 into $$f(\theta, r_0(\theta)) = g_1(\theta, r_0(\theta)) + g_2(\theta, r_0(\theta)) + g_3(\theta, r_0(\theta)) + \epsilon_\theta. \quad (6)$$

where $g_3$ term denotes the remaining feature not captured by $g_1$ and $g_2$, if there is any.

Following the updated model (6), identify $g_1$ and $g_2$ will be identified, respectively.

Cylindrical Basis Model

Huang et al. [Huang et al. 2014a, cited above] conducted a thorough investigation of the cylindrical basis model $g_1(\theta, r_0(\theta))$, where $g_1$ was represented in Eq. 4 or $g_1(\theta, r_0(\theta)) = x_0 + \beta_0(r_0 + x_0)^a + \beta_1(r_0 + x_0)^b \cos(2\theta)$. When extending this basis model to generic shape, there is a danger of over-parameterization, that is, the total number of unknown parameters in $g_1$ and $g_2$ will be more than can be estimated from the data. Therefore, an alternative model studies in Huang et al. [Huang et al. 2014a, cited above] was adopted.

$$g_1(\theta, r_0(\theta)) = \beta_0 r_0^a + \beta_1 r_0^b \cos(2\theta) \quad (7)$$

A Bayesian procedure was implemented to draw inferences on all parameters $\beta_0, \beta_1, a, b$, and $\sigma$. The posterior distribution of the parameters was calcluated by Markov Chain Monte Carlo (MCMC), and the marginal posteriors was summarized by taking the mean, median, standard deviation, and 2.5% and 97.5% quantiles of the posterior draws in the following Table.

TABLE 4

Summary of posterior draws Huang et al. [Huang et al. 2014a, cited above]

| | Mean | SD | 2.5% | Median | 97.5% |
|---|---|---|---|---|---|
| $\beta_0$ | −0.0047 | 4.063 × 10⁻⁵ | −0.0048 | −0.0047 | −0.0047 |
| $\beta_1$ | 0.0059 | 6.847 × 10⁻⁵ | 0.0058 | 0.0059 | 0.0060 |
| a | 1.566 | 0.0084 | 1.5498 | 1.566 | 1.5819 |
| b | 1.099 | 0.0120 | 1.0755 | 1.099 | 1.1232 |
| $\sigma$ | 0.0019 | 2.503 × 10⁻⁵ | 0.00185 | 0.0019 | 0.00195 |

Due to apparent pattern change presented in FIG. 5A, the cylindrical basis model $g_1(\theta, r_0(\theta))$ after machine repair are expected to have different coefficients $\beta_0$ and $\beta_1$. On the other hand, a and b are intended to be kept as the same values in Table 4 for two reasons: (1) $r_0^a$ and $r_0^b$ in Eq. (7) represent the volumetric shrinkage varying with size $r_0$. For the same material, the change after MIP-SLA machine repair might be small. (2) Concern of over-parameterization limits the number of unknown parameters in the model. Therefore, the cylindrical basis function used is $$g_1(\theta, r_0(\theta)) = \beta_0 r_0^{1.566} + \beta_1 r_0^{1.099} \cos(2\theta). \quad (8)$$

Cookie-Cutter Basis Model for Polygon Shapes

By observing the deviation polygon profiles before and after the machine repair, two alternatives of cookie-cutter basis models are proposed: (i) square wave model, and (ii) sawtooth wave model.

Square wave mode: A square wave is a non-sinusoidal periodic waveform in which the amplitude alternates at a steady frequency between fixed minimum and maximum values. One of its functional form is sign[ $\cos(\theta)$] with sign[•] being a sign function. Since the number of polygon sides n should change the period of the square wave function, the cookie-cutter function is proposed to trim a polygon from a cylinder as $$g_2(\theta, r_0(\theta)) = \beta_2 r_0^\alpha \text{ sign } [\cos(n(\theta - \phi_0)/2)] \quad (9)$$

where $\phi_0$ is a phase variable to shift the cutting position in the PCS. It is determined by the smallest angular distance from the vertex of a polygon to the axis of the PCS. For instance, $\phi_0$ is $\pi/4$ for a square shape and $(\frac{1}{2} - \frac{2}{5})\pi$ for a pentagon with a a polar axis being horizontal in FIGS. 4A-4B. Here coefficients $\beta_2$ and $\alpha$ are to be estimated.

Figure 8:
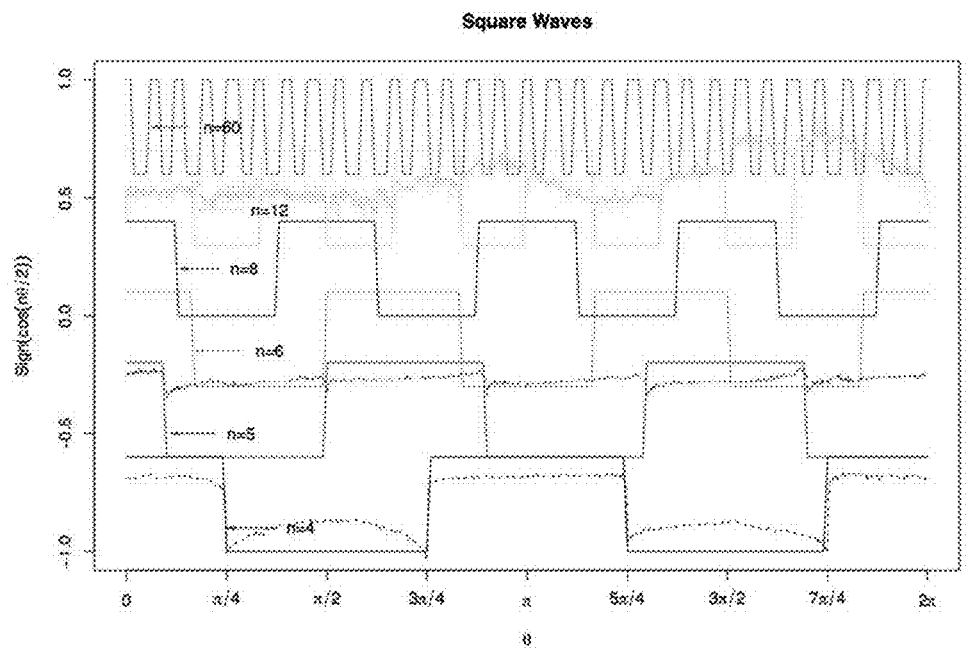
FIG. 8 illustrates square wave functions with square, pentagon, and dodecagon deviation profiles.

The cookie-cutter functions for polygons with n=4, 5, 6, 8, 12, and 60 sides were plotted. Meanwhile, the magnitudes of the deviation profiles observed for a square, pentagon, and dodecagon were scaled, and the profiles on their corresponding cookie-cutter functions were superimposed. FIG. 8 illustrates square wave functions with square, pentagon, and dodecagon deviation profiles. As shown in FIG. 8, the cookie-cutter model in Eq. (9) perfectly capture the sharp transitions around the vertices of polygons in the deviation profiles. Furthermore, when n approaches to infinity and a polygon is supposed to become a circle, the cookie-cutter function approaches white noise. The limiting property makes sense.

Sawtooth wave model: An alternative cookie-cutter model is a sawtooth wave model. One observation from the pentagon and dodecagon deformation is the presence of some sort sawtooth-like wave form. The sawtooth function may be defined formally as:

$$\text{saw.tooth}(\theta - \phi_0) = (\theta - \phi_0) \text{MOD}(2\pi/n)$$

where the MOD function is used in the usual sense to obtain remainders (as in x MOD y=remainder of (x/y)).

Figure 9A:
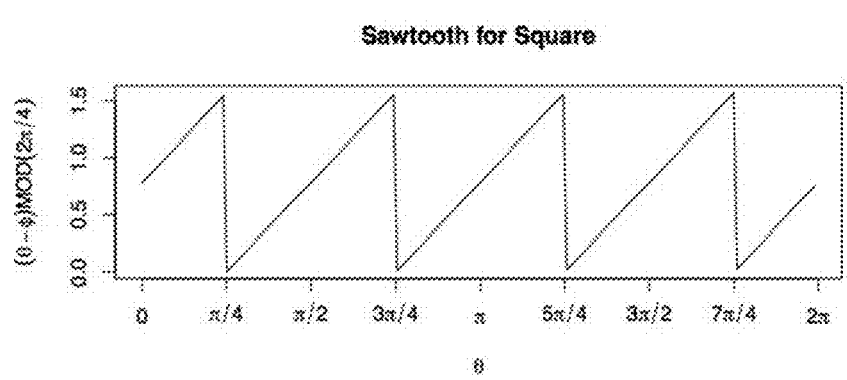
FIGS. 9A-9B illustrate examples of sawtooth wave functions for a square (FIG. 9A) and a pentagon (FIG. 9B).
Figure 9B:
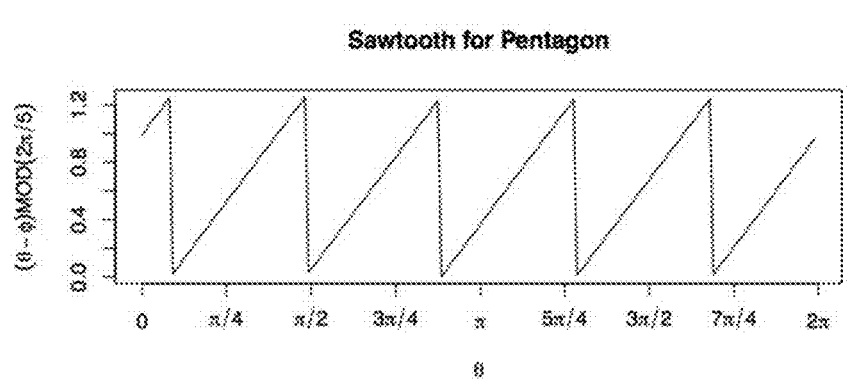

FIGS. 9A-9B illustrate examples of sawtooth functions for a square (FIG. 9A) and a pentagon (FIG. 9B). Comparing the definition of square wave function, it is clear that sawtooth wave function will also capture the sharp transitions around the vertices of polygons in the deviation profiles. It preserves the limiting property when n approaches to infinity.

To control the direction of each sawtooth (flipping upside down), an indicator function may be introduced:

$$I(\theta-\phi_0)=\{sign[\sin(n(\theta-\phi_0)/2)]+1\}/2 \quad (10)$$

The alternative cookie-cutter basis using sawtooth wave function is therefore given as $$g_2(\theta, r_0(\theta)) = \beta_2 r_0^\alpha I(\theta - \phi_0) saw.tooth(\theta - \phi_0) \quad (11)$$

$$= \beta_2 r_0^\alpha \{sign[\sin(n(\theta - \phi_0)/2)] + 1\}/2[(\theta - \phi_0)\text{MOD}(2\pi/n)]$$

Residual Pattern Along Polygon Sides

If cylindrical basis $g_1(\theta, r_0(\theta))$ and cookie-cutter basis $g_2(\theta, r_0(\theta))$ cannot fully capture the patterns in the deviation profiles, additional $g_3(\theta, r_0(\theta))$ term can be introduced if necessary. Then, individual sides of a polygon may have a higher-order deviation pattern after trimming by the cookie-cutter, there could be another term $\cos[n(\theta-\phi_0)]$ or $\sin[n(\theta-\phi_0)]$ which also has the consistent limiting property.

Statistical Model Estimation

Initial Model Fitting for Individual Polygon Shapes

To test the proposed modeling strategy and cookie-cutter function, a statistical model for individual product shapes observed in the experiment was fit first. Given a cookie-cutter function, e.g., square wave function, the model (6) can be simplified by merging variables as $$f(\theta,r_0(\theta))=\beta_0+\beta_1\cos(2\theta)+\beta_2 sign[\cos(n(\theta-\phi_0)/2)]+\beta_3\cos(n\theta)+\epsilon \quad (12)$$

The Least Square Estimation (LSE) was applied to estimate the individual models for three types of polygons. The estimated model parameters of Eq. 12 for fabricated product are shown in Table 5. The fitted models are shown as dash lines in FIGS. 5A-5B, 6A-6B, and 7A-7B, respectively. As can be seen in FIGS. 5A-5B, with only three base functions, the model (12) captures the deviation pattern of square shapes very well (before machine repair), comparing with many model terms for Fourier series.

TABLE 5

Individual model estimation for polygons

| Polygon | Parameter | Estimate | Std. Error | P-value | Residual $\sigma_\epsilon$ |
|---|---|---|---|---|---|
| 1" square | $\beta_0$ | 1.5149e−3 | 1.313e−4 | ≈0 | |
| | $\beta_1$ | 5.706e−4 | 3.571e−4 | 0.11 | 0.003207 |
| | $\beta_2$ | 2.343e−3 | 2.173e−4 | ≈0 | |
| | $\beta_3$ | 1.561e−3 | 1.733e−4 | ≈0 | |
| 2" square | $\beta_0$ | −5.470e−03 | 8.924e−05 | ≈0 | |
| | $\beta_1$ | −8.053e−04 | 2.618e−04 | 0.00217 | 0.002568 |
| | $\beta_2$ | 7.856e−03 | 1.678e−04 | ≈0 | |
| | $\beta_3$ | 2.071e−03 | 1.211e−04 | ≈0 | |
| 3" square | $\beta_0$ | −9.763e−03 | 8.771e−05 | ≈0 | |
| | $\beta_1$ | −2.776e−03 | 2.640e−04 | ≈0 | 0.002597 |
| | $\beta_2$ | 1.266e−02 | 1.714e−04 | ≈0 | |
| | $\beta_3$ | 2.797e−03 | 1.204e−04 | ≈0 | |
| 1" pentagon | $\beta_0$ | 1.317e−03 | 2.160e−05 | ≈0 | |
| | $\beta_1$ | 8.255e−04 | 3.173e−05 | ≈0 | 0.001812 |
| | $\beta_2$ | 8.739e−04 | 2.314e−05 | ≈0 | |
| | $\beta_3$ | 1.178e−03 | 3.245e−05 | ≈0 | |
| 3" pentagon | $\beta_0$ | 1.310e−02 | 2.062e−05 | ≈0 | |
| | $\beta_1$ | 3.584e−04 | 3.158e−05 | ≈0 | 0.002768 |
| | $\beta_2$ | 2.546e−04 | 2.251e−05 | ≈0 | |
| | $\beta_3$ | 2.012e−04 | 3.003e−05 | ≈0 | |
| 3" dodecagon | $\beta_0$ | 1.391158e−02 | 1.496537e−05 | ≈0 | |
| | $\beta_1$ | −1.417587e−04 | 2.089859e−05 | ≈0 | 0.002138664 |
| | $\beta_2$ | 7.680937e−05 | 1.494737e−05 | 2.7925e−07 | |
| | $\beta_3$ | 3.338678e−04 | 2.033879e−05 | ≈0 | |

However, model (12) seems unable to explain pentagon and dodecagon well (FIGS. 6A-6B and 7A-7B). The potential reason can be attributed to process condition change. As mentioned in the section Experimental Design and Observation above, pentagon and dodecagon products were fabricated after the repair of the MIP-SLA machine. The sawtooth pattern is more obvious after repair, which may cause the poor fitting for pentagon and dodecagon shapes based on model (12).

An Integrated Model Fitting for Polygons

The initial model fitting for individual polygon shapes suggest the use of sawtooth wave function as cookie-cutter basis model after the machine repair. In this section, an attempt is made to fit one integrated model (6) for all polygons fabricated after machine repair. Square shape is used with side length 2", 1" and 3" pentagons to fit one model and validate the model using 3" dodecagon data. Specifically, the model after the machine repair is $$f(\theta, r_0(\theta)) = g_1(\theta, r_0(\theta)) + g_2(\theta, r_0(\theta)) + \epsilon \quad (13)$$

$$= \beta_0 r_0^{1.566} + \beta_1 r_0^{1.099} \cos(2\theta) +$$

$$\beta_2 r_0^\alpha I(\theta - \phi_0) saw.tooth(\theta - \phi_0) + \epsilon$$

Here starts without high-order term $g_3(\theta, r_0(\theta))$.

To fit this nonlinear model, a Bayesian approach is used to find parameter estimation and will maximize the log-likelihood function. The optimization routine optim( ) in R was implemented. The estimated model parameters and residual standard deviation is given in Table 6:

TABLE 6

Integrated model estimation for polygons

| $\beta_0$ | $\beta_1$ | $\beta_2$ | $\alpha$ | Residual $\sigma_\epsilon$ |
|---|---|---|---|---|
| .00297 | 5.30065e−05 | 1.2315e−09 | 1.36459 | 0.00283 |

Figure 10A:
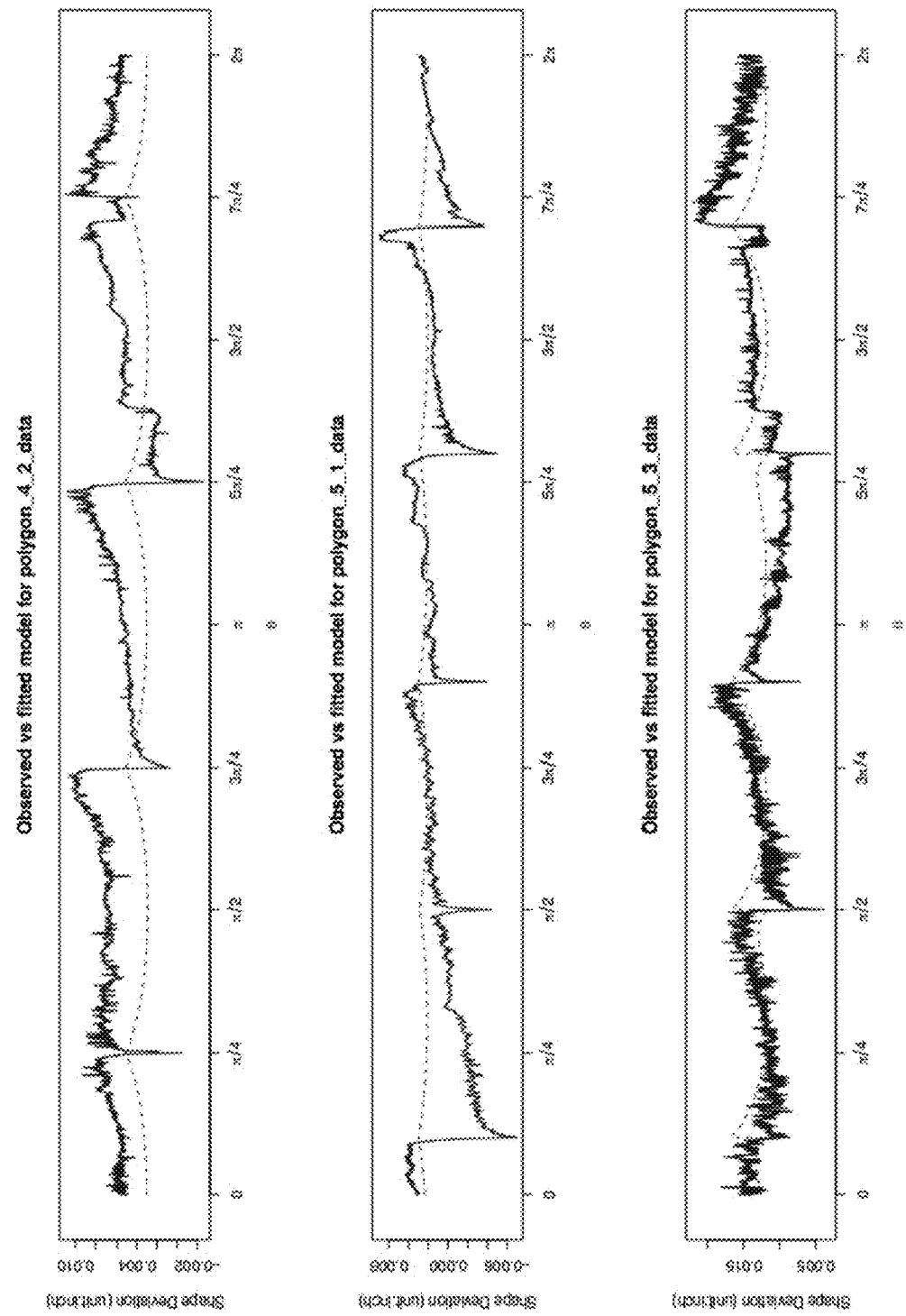
FIGS. 10A-10B illustrate integrated model prediction and validation.
Figure 10B:
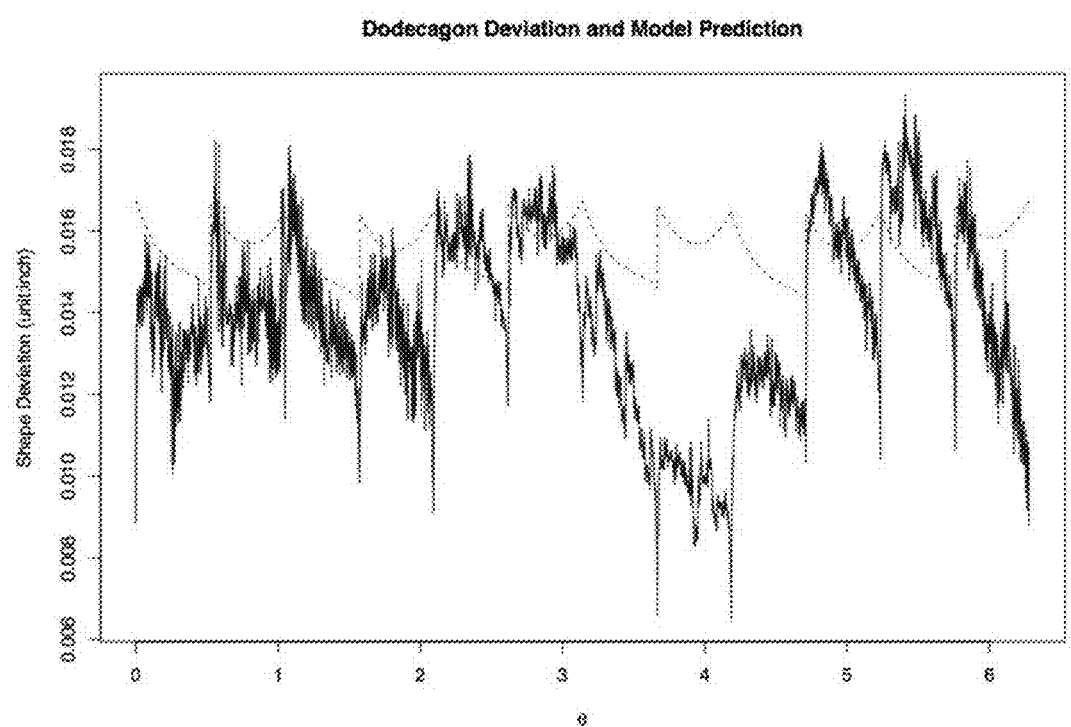

The observed data and model prediction for three polygons are illustrated in FIG. 10A. FIG. 10B shows the prediction for dodecagon shape. Note that dodecagon data was not used in the model training date set.

Optimal Compensation and Experimental Validation

FIG. 10B depicts model validation by predicting dodecagon deviation profile. Following the compensation method proposed in Huang et al. [Huang et al. 2014a, cited above], $f(\theta, r_0(\theta), x(\theta))$ is denoted as the profile deviation at angle $\theta$ when compensation $x(\theta)$ is applied. Since $x(\theta)$ is small, it is reasonably to believe that the dynamics of the manufacturing and shrinkage processes remain the same under compensation as compared to the entire process without compensation. The objective of optimal compensation strategy is find $x^*(\theta)$ such that $E[f(\theta, r_0(\theta), x^*(\theta))|\theta] = 0$.

Huang et al. [Huang et al. 2014, cited above] derived the optimal amount of compensation $x^*(\theta)$ as $$x^*(\theta) = -\frac{g(\theta, r_0(\theta))}{1 + g'(\theta, r_0(\theta))}. \tag{14}$$

where $g(\cdot, \cdot)$ is defined as $E[f(\cdot, \cdot)|\theta]$ and $g'(\theta, r_0(\theta))$ is the derivative with respect to $r_0(\theta)$. Notice that the optimal compensation is not simply apply $-g(\theta, r_0(\theta))$, i.e., the negative value of the observation deviations.

For a polygon with n sides and circumcircle radius $r_0$, the predicted deviation $g(\theta, r_0(\theta))$ of model (13) is $$g(\theta, r_0(\theta)) = \beta_0 r_0^{1.566} + \beta_1 r_0^{1.099} \cos(2\theta) + \beta_2 r_0^\alpha I(\theta - \phi_0) \text{saw.tooth}(\theta - \phi_0), \tag{15}$$

and the corresponding optimal amount of compensation $x^*(\theta)$ is $$x^*(\theta) = -\frac{\beta_0 r_0^{1.566} + \beta_1 r_0^{1.099} \cos(2\theta) + \beta_2 r_0^\alpha I(\theta - \phi_0) \text{saw.tooth}(\theta - \phi_0)}{1 + 1.566\beta_0 r_0^{0.566} + 1.099\beta_1 r_0^{0.099} \cos(2\theta) + (\alpha - 1)\beta_2 r_0^{\alpha-1} I(\theta - \phi_0) \text{saw.tooth}(\theta - \phi_0)} \tag{16}$$

Figure 11A:
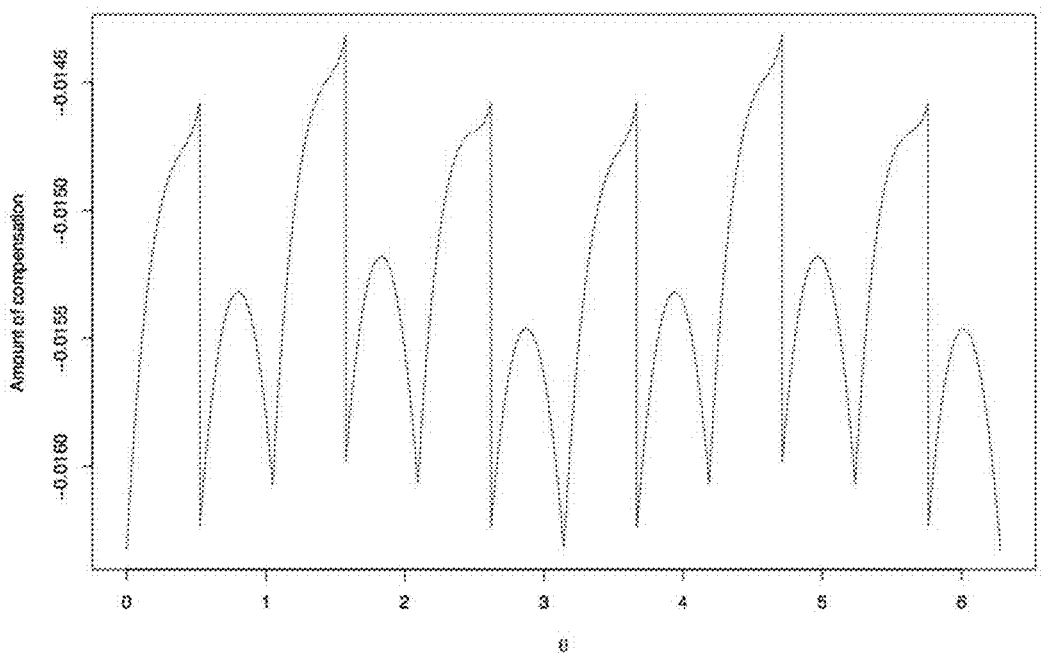
FIGS. 11A-11B illustrate optimal compensation and experimental validation.
Figure 11B:
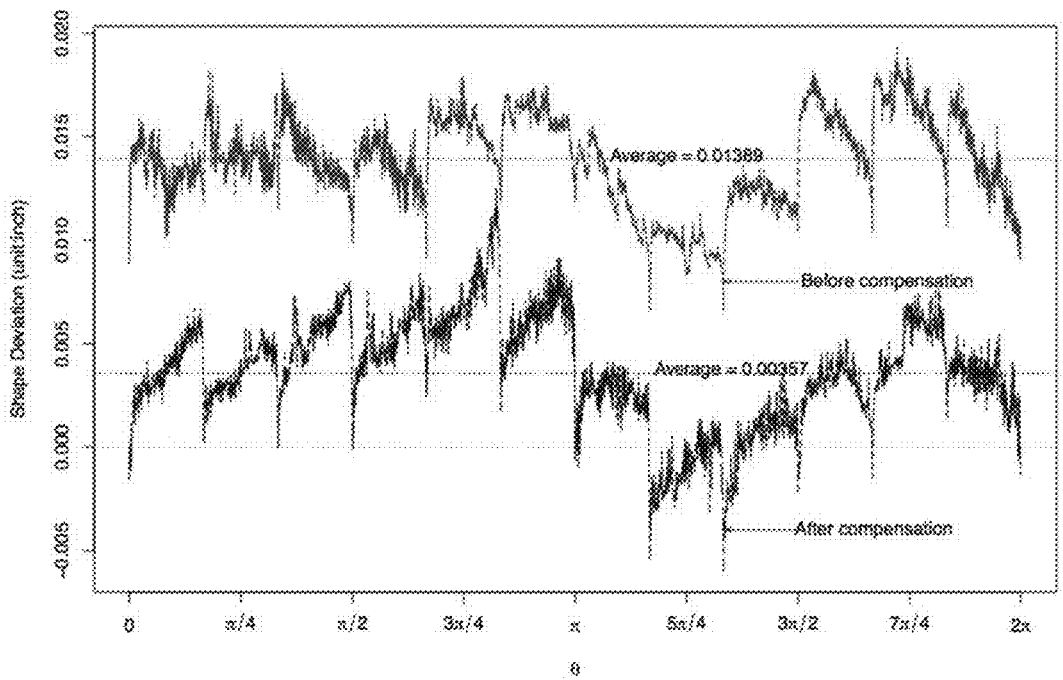

FIGS. 11A-B illustrate optimal compensation and experimental validation. FIG. 11A shows an optimal compensation $x^*(\theta)$. FIG. 11B shows dodecagon deviation profiles before and after compensation.

The optimal amount of compensation $x^*(\theta)$ for 3" dodecagon is illustrated in FIG. 11A. A compensation experiment was conducted by applying compensation $x^*(\theta)$ to a 3" dodecagon. FIG. 11B compares the deviation profiles before and after the compensation. The validation and compensation experiments indicate that:

The average profile deviation was reduced from 0.01389" to 0.00357" an average of 75% reduction was achieved. The modeling strategy given in Eq. (6), statistical predictive model (13), optimal compensation model (16) are generally robust and predictive.

The training data for establishing polygon model (13) and optimal compensation model (16) only include square and pentagon shapes. The validation experiment conducted for dodecagon is therefore not within the experimental range of polygon sides. This provides greater confidence in the model robustness.

The deviation profile after compensation still shows systematic patterns in FIG. 11B. The possible aspects for model refinement could include: (1) improving cylindrical basis model $g_1(\theta, r_0(\theta))$ in Eq. (8) by collecting more cylinder data after machine repair and (2) introducing $g_3(\theta, r_0(\theta))$ to improve the prediction along polygons sides.

Figure 12:
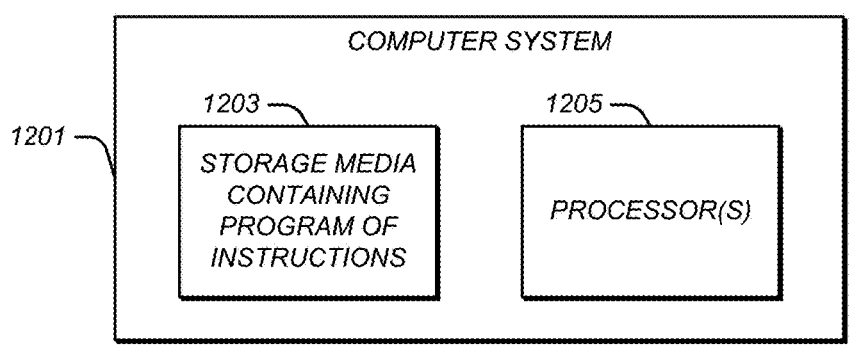
FIG. 12 illustrates an example of a computer system that implements one or more of the various algorithms disclosed herein.

FIG. 12 illustrates an example of a computer system 1201 that implements one or more of the various algorithms disclosed herein. The computer system includes a non-transitory, tangible, computer-readable storage media 1203 containing a program of instructions and one or more hardware processors 1205. The computer system includes tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

The computer system may include one or more computers at the same or different locations. When at different locations, the computers may be configured to communicate with one another through a wired and/or wireless network communication system.

The program of instructions in the storage media 1203 may include associated data and libraries. The programming instructions are configured to implement one or more of the algorithms described herein.

The storage media 1203 may include one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A non-transitory, tangible, computer-readable storage media containing a program of instructions that causes a computer system having a processor running the program of instructions to:
   receive design information indicative of the design of a three-dimensional object to be printed by a three-dimensional printer;
   receive test product deformation information indicative of deformation in the profiles of no more than five, three-dimensional test products that have a circular or polygonal cross section that were made by the three-dimensional printer;
   generate polygon product deformation information indicative of a predicted deformation of a polygon shape that the three-dimensional printer will print and that has a number of sides and a number of sizes that are both different from each of the number of sides and number of sizes that the no more than five, three-dimensional test products have; and
   generate adjustment information indicative of an adjustment needed to print a desired profile of the polygon shape that the three-dimensional printer will print to make the printed shape accurate; and cause the three-dimensional printer to print the desired profile of the polygon shape with the needed adjustment.

2. The storage media of claim 1 wherein the product deformation information is predictive of the deformation in the profiles of the no more than five, three-dimensional test products and is not measured.

3. The storage media of claim 2 wherein the prediction about the product deformation has an uncertainty and wherein the program of instructions causes the computer system to quantify that uncertainty from the test product deformation information.

4. The storage media of claim 1 wherein the wherein the program of instructions causes the computer system to generate the polygon product deformation information by utilizing a mathematical function that defines a relationship between a circle and a polygon.

5. The storage media of claim 4 wherein the mathematical function includes a square wave or sawtooth functional term.

6. The storage media of claim 4 wherein the mathematical function is learned from the test product deformation information.

7. The storage media of claim 1 wherein the program of instructions causes the computer system to optimize the adjustment needed to print the desired profile of the polygon shape by minimizing the predicted deformation of the polygon shape.

* * * * *